US00RE39292E

(19) United States
(12) Reissued Patent
Latos et al.

(10) Patent Number: US RE39,292 E
(45) Date of Reissued Patent: Sep. 19, 2006

(54) APPARATUS AND METHOD FOR DOWNHOLE FLUID PHASE SEPARATION

(75) Inventors: Gordon D. Latos, Calgary (CA); John E. Ravensbergen, De Winton (CA)

(73) Assignee: BJ Services Company, Houston, TX (US)

(21) Appl. No.: 10/879,890

(22) Filed: Jun. 29, 2004

Related U.S. Patent Documents

Reissue of:
(64) Patent No.: 6,138,757
Issued: Oct. 31, 2000
Appl. No.: 09/028,939
Filed: Feb. 24, 1998

(51) Int. Cl.
*E21B 43/38* (2006.01)

(52) U.S. Cl. ..... 166/265; 166/105.5
(58) Field of Classification Search ..... 166/72, 166/90.1, 105.5, 265, 266; 210/170, 747; 55/421
See application file for complete search history.

(56) References Cited

U.S. PATENT DOCUMENTS

| | | | | | |
|---|---|---|---|---|---|
| 336,317 | A | * | 2/1886 | Hitchcock | |
| 1,279,758 | A | * | 8/1918 | Putnam | |
| 2,329,745 | A | | 9/1943 | Crook | 255/71 |
| 2,652,130 | A | * | 9/1953 | Ferguson | 183/2.7 |
| 3,094,175 | A | | 6/1963 | Jackson | 175/69 |
| 3,291,057 | A | * | 12/1966 | Carle | 103/113 |
| 3,625,288 | A | * | 12/1971 | Roeder | 166/314 |
| 4,015,662 | A | | 4/1977 | Cochran | 166/104 |
| 4,074,763 | A | * | 2/1978 | Stevens | 166/325 |
| 4,241,788 | A | * | 12/1980 | Brennan | 166/105.5 |
| 4,448,607 | A | | 5/1984 | Johnson et al. | 106/19 |
| 4,481,020 | A | * | 11/1984 | Lee et al. | 96/214 |
| 4,531,584 | A | * | 7/1985 | Ward | 166/265 |
| 4,981,175 | A | * | 1/1991 | Powers | 166/265 |
| 5,173,022 | A | * | 12/1992 | Sango | 415/169.1 |
| 5,240,083 | A | | 8/1993 | Lyon | 175/324 |
| 5,291,956 | A | | 3/1994 | Mueller et al. | 175/67 |
| 5,314,018 | A | * | 5/1994 | Cobb | 166/265 |
| 5,355,967 | A | * | 10/1994 | Mueller et al. | 175/65 |
| 5,394,951 | A | | 3/1995 | Pringle et al. | 175/61 |
| 5,431,228 | A | * | 7/1995 | Weingarten et al. | 166/357 |
| 5,482,117 | A | * | 1/1996 | Kolpak et al. | 166/265 |
| 5,662,167 | A | * | 9/1997 | Patterson et al. | 166/265 |
| 5,693,225 | A | * | 12/1997 | Lee | 210/512.2 |
| 6,039,116 | A | * | 3/2000 | Stevenson et al. | 166/263 |

* cited by examiner

*Primary Examiner*—Zakiya Walker
(74) *Attorney, Agent, or Firm*—Howrey LLP

(57) ABSTRACT

Method and apparatus for separating fluids flowing through a downhole well passageway including separating fluids pumped downhole, centrifugal separation, gradually increasing centrifugal acceleration, the establishment of annular flow, gradually establishing annular flow, a receiving chamber of increasing cross-sectional area of flow and method and apparatus for use of a fluid separator tool with tubing for downhole well operations, in particular with coiled tubing.

52 Claims, 6 Drawing Sheets

FIG.4A
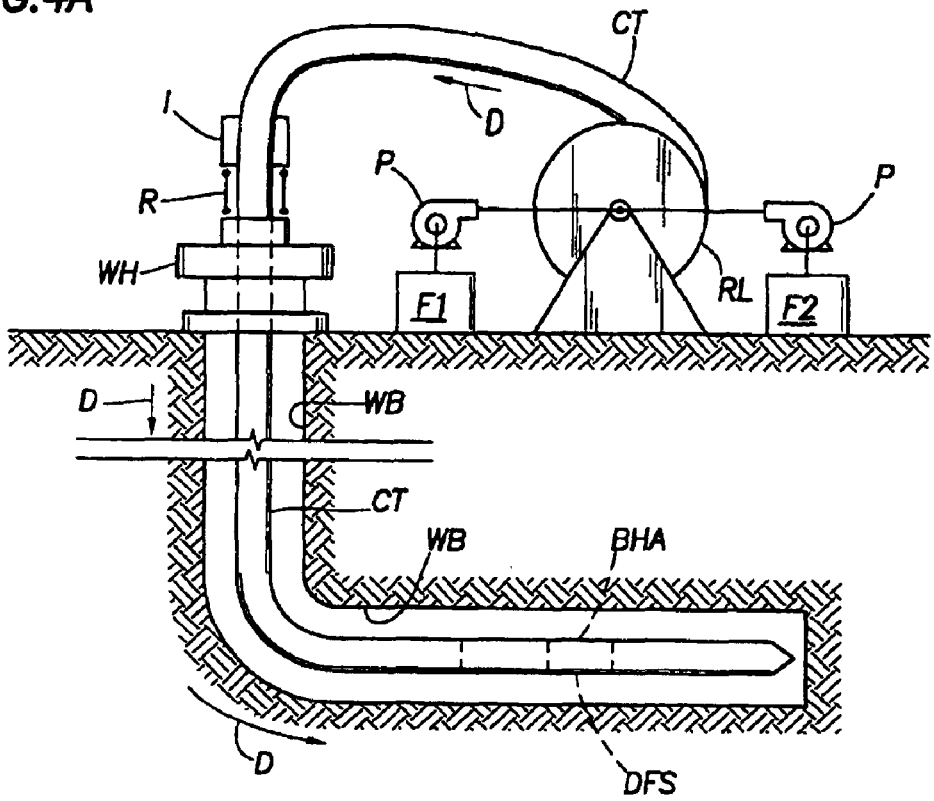
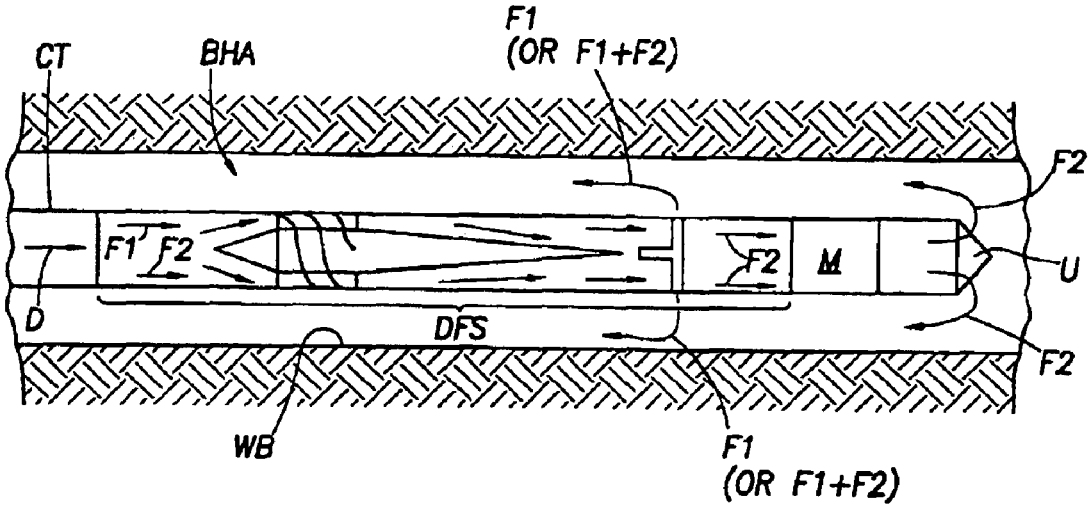
FIG.4B

FIG. 7

| | DOWNHOLE GAS SEPARATOR NUMERICAL SIMULATION | | TOP OF O.D. CONE | | TOP OF I.D. CONE | | MID POINT OF O.D. CONE | | BOTTOM OF I.D. CONE | GAS EXTRACTION POINT | BOTTOM OF O.D. CONE |
|---|---|---|---|---|---|---|---|---|---|---|---|
| | AXIAL POSITION | (in) | 0.000 | 0.240 | 0.250 | 3.000 | 5.750 | 8.500 | 11.250 | 14.000 | 15.000 |
| 1 | FLOW PATH O.D. | (in) | 1.375 | 1.375 | 1.375 | 1.375 | 1.375 | 1.375 | 1.375 | 1.375 | 1.375 |
| 1 | FLOW PATH I.D. | (in) | 1.000 | 1.000 | 1.000 | 0.766 | 0.531 | 0.297 | 0.063 | 0.000 | 0.000 |
| 1 | FLOW PATH AREA | ($in^2$) | 0.699 | 0.699 | 0.699 | 1.025 | 1.263 | 1.416 | 1.482 | 1.485 | 1.485 |
| | REMAINING GAS MASS FRACTION | | 100% | 100% | 100% | 100% | 100% | 100% | 100% | 100% | 1.3% |
| | REMAINING LIQUID MASS FRACTION | | 100% | 100% | 100% | 100% | 100% | 100% | 100% | 100% | 82.6% |
| | PRESSURE | (psi) | 2555 | 2554 | 2554 | 2548 | 2542 | 2536 | 2532 | 2530 | 2526 |
| | AVERAGE DENSITY | (kg/L) | 0.899 | 0.899 | 0.899 | 0.898 | 0.898 | 0.898 | 0.898 | 0.898 | 0.998 |
| | GAS VOLUME FLOW RATE | (L/min) | 27 | 27 | 27 | 27 | 27 | 27 | 28 | 28 | 0 |
| | LIQUID VOLUME FLOW RATE | (L/min) | 194 | 194 | 194 | 194 | 194 | 194 | 194 | 194 | 160 |
| | COMBINED VOLUME FLOW RATE | (L/min) | 221 | 221 | 221 | 221 | 221 | 221 | 221 | 221 | 160 |
| 3 | SWIRL DIRECTION WRT AXIS | | | | | | MIN PICKUP DIA. | | | 0.485 | |
| 3 | | O.D.(degrees) | 67.2 | 67.2 | 67.2 | 72.7 | 74.6 | 74.7 | 73.3 | 70.1 | 74.0 |
| 3 | | NOMINAL(degrees) | 64.1 | 64.1 | 64.1 | 70.2 | 72.3 | 72.4 | 70.9 | 67.3 | 71.6 |
| 3 | | I.D.(degrees) | 60.0 | 60.0 | 60.0 | 66.9 | 69.3 | 69.4 | 67.6 | 63.6 | 68.5 |
| 2 | AXIAL VELOCITY | (in/sec) | 321 | 321 | 321 | 219 | 178 | 159 | 152 | 151 | 110 |
| 4 | TANGENTIAL VELOCITY | O.D.(in/sec) | 766 | 766 | 766 | 706 | 646 | 581 | 506 | 419 | 383 |
| 4 | | NOMINAL(in/sec) | 661 | 661 | 661 | 610 | 558 | 501 | 437 | 362 | 331 |
| 4 | | I.D.(in/sec) | 557 | 557 | 557 | 513 | 470 | 422 | 368 | 305 | 278 |
| | TOTAL NOMINAL VELOCTIY | (in/sec) | 735 | 735 | 735 | 648 | 586 | 526 | 463 | 393 | 348 |
| 6 | RADIAL PRESSURE GRADIENT | (psi) | 11.61 | 11.61 | 11.61 | 17.78 | 23.17 | 27.23 | 29.33 | 22.03 | 20.41 |
| 5 | ACCELERATION | O.D.(g) | 2207 | 2207 | 2207 | 1876 | 1573 | 1269 | 966 | 662 | 552 |
| 5 | | NOMINAL(g) | 1906 | 1906 | 1906 | 1798 | 1692 | 1557 | 1378 | 988 | 412 |
| 5 | | I.D.(g) | 1605 | 1605 | 1605 | 1782 | 2153 | 3109 | 11237 | #N/A | #N/A |
| | RESIDENCE TIME | APPROXIMATE(ms) | 0.4 | 0.4 | 4.3 | 12.5 | 15.5 | 17.3 | 18.1 | 12.4 | 17.1 |
| | | CUMULATIVE(s) | 0.000 | 0.001 | 0.005 | 0.018 | 0.033 | 0.050 | 0.068 | 0.081 | 0.086 |

APPARATUS AND METHOD FOR DOWNHOLE FLUID PHASE SEPARATION

Matter enclosed in heavy brackets [ ] appears in the original patent but forms no part of this reissue specification; matter printed in italics indicates the additions made by reissue.

FIELD OF THE INVENTION

This invention relates to fluid downhole separators and fluid separating, and more particularly to downhole fluid separators using centrifugal separating techniques and wherein a plurality of fluids pumped downhole are separated and where the separation is particularly useful in coiled tubing operations.

BACKGROUND OF THE INVENTION

There are occasions in the oil and gas industry when a gas may be pumped downhole together with a liquid phase such as a treatment fluid or a drilling fluid. In particular it may be useful to pump nitrogen gas downhole during drilling or during well workover operations. There could be a variety of purposes for pumping downhole a gas with a liquid phase. Such purposes might include helping to lift liquids back to the surface and/or lowering the pressure exerted by the combination of fluids against fragile welllbores. "Underbalanced" drilling, for instance, typically utilizes a gas added to a drilling fluid to "underbalance" the pressure between the drilling fluid and portions of the formation that are open downhole.

One illustration of a well workover application where it might be useful to pump gas downhole is in rotary jet cleaning. In rotary jet cleaning a liquid is pumped downhole and out of a rotary jet cleaning tool. Gas could be advantageously added to the liquid in so far as the gas could help lift and circulate the cleaning liquid back up hole, possibly enhancing the liquid's capacity to carry debris. Drilling with a downhole motor and rotary jet drilling might have similar applications in which it could be advantageous to add gas to a working liquid, at least for lifting purposes. However, running mixed gas/liquid phase through a downhole hydraulically powered motor or other apparatus, such as a downhole drilling motor or a rotary jet cleaning tool, is not favored. The gas/liquid phase neither optimizes downhole motor performance nor optimizes maintenance of the motor parts. Sending a mixed gas/liquid phase through a rotary jet cleaner, in addition, may result in the loss of optimum cleaning power.

One aspect of the instant invention, therefore, is a methodology and apparatus affording the ability to remove a gas phase at or in a bottomhole assembly (BHA) when the presence of the gas downhole could be helpful but when it would also be useful to prevent the gas from invading and damaging elastomers in a drilling motor and/or to optimize the cleaning performance of a rotary jet cleaner by excluding a gas phase.

Existing commercially available downhole liquid/gas flow separators seem to be designed for separating production fluids. These are fluids flowing up either under natural pressure or being pumped. These separators appear optimized for narrow ranges of gas volume fraction and/or for high values of entry or initial gas volume fraction. They appear typically optimized for entry gas volume fractions of between 90% and 100% and for exit gas volume fractions of between 15% and 50%. See U.S. Pat. No. 5,482,117, column 1, line 58. These entry ranges are too high and too narrow to be useful for generally separating fluid mixtures, in particular gas/liquid mixed phase fluids, that might be pumped downhole in either a drilling application or in a jetting application or in other workover applications. The exit volume fractions are also too high.

The problems involved in cost effectively, efficiently and sufficiently separating pumped fluids flowing downhole are different from the problems involved in sufficiently separating well fluids produced into a well to be flowed or pumped up.

A further aspect of the present invention includes the design of an efficient and effective downhole fluid phase separator, which includes gas/liquid separating, that can effectively and efficiently operate without excessive loss of pressure to the fluid pumped downhole and can operate over a range of supplied gas volume fractions that might run from 10% through 90%. Further, the separator must not be too long. Important aspects of the invention include the length of the separator, ideally below three (3) feet, and the pressure drop caused by the tool, preferably below 10% of the supplied fluid pressure. The outside diameter of the tool will be limited by the diameter of the wellbores through which the bottomhole assembly is designed to run. Simplicity of operation and the absence of moving parts are further advantageous features found in embodiments of the instant design which enhance the value of the tool.

Disclosed herein is a preferred embodiment for a fluid (particularly including liquid/gas) phase separator for use on fluid mixtures pumped downhole, and its methods of use. One prime application lies with coiled-tubing-based downhole operations. The device separates fluids by density, including nitrified treatment fluids and nitrified drilling fluids. The fluids are separated into at least two constituent phases or portions. The device can be structured and designed to optimize the separation of one stream, such as a liquid stream, so that the stream is relatively free of a second fluid, such as a gas. "Relatively" in the instant environment means at least 75% free. Preferred embodiments have achieved significantly greater percentages of separation.

For purposes herein fluids are distinguished or characterized as separate fluids by their density, or at least by their capacity to be separated by density. Use of the term fluid mixture implies a mixture of fluids with different densities or at least a mixture of fluids that can be separated into at least two streams by density. The disclosed tool and method separate a fluid mixture into at least two fluid streams by density and subsequently permit directing each stream to a different path in accordance with useful applications.

In the present invention separating fluids by density is preferably achieved by inducing centrifugal acceleration, or a swirling flow path, to a moving fluid stream. Preferably a significant annular flow is first or also induced within the limits of space available. Preferably also a gradually expanding flow path in terms of cross-sectional area of flow is defined in a chamber that receives centrifugally accelerated fluids.

It should be understood that the distinct stages of the disclosed preferred embodiment herein could be overlapped in alternate designs. Distinct steps disclosed by the preferred embodiment could be made simultaneous or partially simultaneous. The instant design facilitated testing of functionality. With the present design the length of the tool has been shown to be able to be satisfactorily minimized, as has the loss of head pressure for the pumped fluids due to the separation process. High efficiencies in the separation of gas from liquid have been shown to be achievable.

In regard to gas/liquid separation, which is a prime application, shop tests have indicated that a separation efficiency can be achieved such that less than three percent (3%) of the original gas is left in a liquid fluid stream. This was achieved with a tool having less than three feet of length (More than 3% of the original liquid may or may not be left in the gas, as this may not be a critical parameter.) It will be understood that multiple stages could be utilized to improve further gas separation efficiency. Alternately, gas separation efficiency could be improved by accepting more liquid in the gas discharge stream.

The combination of features designed into preferred embodiments of the tool, and designed into preferred embodiments of the methodology disclosed, advantageously provides the ability to function effectively, efficiently and economically under significant size and performance limitations, as required for downhole operations.

SUMMARY OF THE INVENTION

The invention teaches a downhole method and apparatus for separating fluids flowing through a passageway in a well. The method includes centrifugally accelerating flow of fluid downhole through at least a portion of a downhole passageway and separating centrifugally accelerated fluid by density into at least two fluid streams. In one aspect the novel method includes pumping a fluid mixture downhole and centrifugally accelerating and separating at least a part of the fluid pumped downward. Fluid pumped "downward" is intended to cover fluid flowing in the wellbore in the direction from the well head or surface and toward the well toe or bottom. It is conceivable that fluid in this "downward" flow path (which is to be distinguished from flow of fluid in the well "upward" or toward the surface) could literally be flowing, gravitationally speaking, "up" for a period of time (or at least not gravitationally "down", as in a horizontal wellbore.) In a second aspect the novel method includes receiving centrifugally accelerated fluid in a chamber defining a flow path having a cross-sectional area of flow that gradually increases. (As illustrated, this can be accomplished without increasing the outside diameter of the flow passageway.) In a third aspect the novel method includes centrifugally accelerating flow of fluid through at least a portion of a downhole passageway wherein the centrifugal acceleration occurs at an increasing rate. A fourth aspect of the invention involves establishing in at least a portion of a downhole well passageway annular fluid flow with the annular flow path having a cross-sectional area of flow with an average radius greater than 75% of the passageway radius. (Passageway radius refers to one-half of the ID of the housing defining the passageway). The average radius of fluid flowing through a passageway with an open (unobstructed) cross-sectional area of flow, for example (as the term average is used herein) would be 50% of the passageway radius. When the term "average" radius is used, the average of all of the distances out from center of the passageway at which fluid flows is meant. No account is intended to be taken, in speaking of an "average" radius, of the fact that a greater volume of fluid flows at a greater radius. A fifth aspect of the invention includes gradually establishing annular fluid flow, preferably prior to or during centrifugal acceleration, in at least a portion of a downhole passageway.

Various combinations of the above embodiments can be practiced. In one preferred embodiment at least two separated fluid streams include a predominately liquid stream and a predominately gas stream. Embodiments of the tool have shown an ability to separate out from a liquid/gas mixed phase a liquid stream that contains less than 5% gas by volume in the liquid stream.

Preferred embodiments have also shown an ability in tests to separate out at least one fluid stream with a head pressure loss through the tool of less than 10% of the tool to wellbore pressure differential.

In the disclosed embodiment the centrifugal accelerating occurs subsequent to the establishment of annular flow. This is not totally necessary. The embodiment disclosed sequentially performed the steps of establishing annular flow, centrifugally accelerating and then receiving into a chamber of gradually expanding cross-sectional area of flow. The embodiment performed well. However, one of skill in the art would realize that the stages could be overlapped or the steps could be performed to a certain extent simultaneously.

The invention includes apparatus for separating fluids flowing in a downhole passageway in a well. One aspect of the apparatus includes a pump attached at the surface to tubing attached to a downhole well assembly where at least a portion of the downhole assembly defines a fluid passageway. At least one vane is attached within a passageway defined by at least a portion of the downhole assembly, the vane passageway being in fluid communication with the pump. Means are provided, in fluid communication with the vane passageway, for separating centrifugally accelerated fluid by density into at least two fluid streams.

In regard to means for separating centrifugally accelerated fluid, the prior art teaches a great variety of alternate designs for separating centrifugally accelerated fluids into at least two streams. The selection of the most appropriate means is a matter of design choice. The choice would likely relate to the prime uses for the device. The instant structure disclosed for performing the separation should be recognized as just one of many different designs known. Selection of individual means is best left to estimates of the prime use for the apparatus and the prime use for the separated streams.

A further aspect of the apparatus of the invention includes at least one vane attached within a passageway defined by at least a portion of a downhole well assembly, together with a chamber in fluid communication with the vane passageway where the chamber defines a flow path having a cross-sectional area of flow that gradually increases. A third aspect of the apparatus of the present invention includes at least one vane attached within a passageway defined by at least a portion of downhole assembly where the vane has a pitch angle graduating from low to high in the direction of flow. A fourth aspect of the apparatus includes a portion of a downhole assembly defining an annular passageway. Preferably the annular passageway defines a flow path having a cross-sectional area of flow with an average radius greater than 75% of the annular passageway radius. A fifth aspect of the invention includes a portion of a downhole assembly defining an annular passageway wherein the annular passageway has gradually increasing annularity in a direction of fluid flow.

Various combinations of the above apparatus embodiments or aspects may be constructed. In one preferred embodiment the vane passageway is located in the downhole assembly downstream of the entry to the annular passageway. Further, in preferred embodiments the apparatus is less than three feet long; the annular passageway of gradually increasing annularity is achieved by locating a diverging tapered barrier, or cone, within a passageway; and the chamber having an increasingly larger cross-sectional area of flow is achieved by locating a tapered barrier, or cone, in that passageway, the taper converging in the direction of flow. In general, as the cross-sectional area of a tapered barrier or cone decreases, the cross-sectional area of flow in a passageway surrounding the barrier increases, and vice versa.

A further aspect of the present invention includes a method for operating a downhole assembly with tubing, preferably coiled tubing, that comprises pumping a fluid mixture down tubing to a downhole assembly, separating the fluid mixture downhole by density into at least two fluid streams and using at least one fluid stream with a downhole assembly tool. In preferred embodiments the downhole assembly tool might be a downhole assembly motor or a downhole assembly jetting tool. The method might also include venting at least one fluid stream to the wellbore. In some embodiments the separating of fluids will separate the fluid mixture into a predominately liquid stream and a predominately gas stream. The invention also includes apparatus for use downhole in a well comprising tubing, preferably coiled tubing, attached to a downhole assembly, a pump attached at the surface to the tubing and a fluid separator associated with the downhole assembly, the fluid separator being operable to separate by density the fluid mixture pumped down the tubing into at least two fluid streams. Preferably the apparatus includes a tool associated with a downhole assembly in fluid communication with at least one separated fluid stream. The tool may comprise a downhole motor or a downhole jetting tool. Preferably the fluid separator is a centrifugal separator.

BRIEF DESCRIPTION OF THE DRAWINGS

The invention will be better understood and objects other than set forth above will become apparent when consideration is given to the following detailed description thereof. Such description makes reference to the annexed drawings wherein:

FIGS. 4A and 4B illustrate apparatus and method of use of the present invention.

FIG. 7 is a table of numerical simulation data.

DESCRIPTION OF THE PREFERRED EMBODIMENTS

Figure 1A:
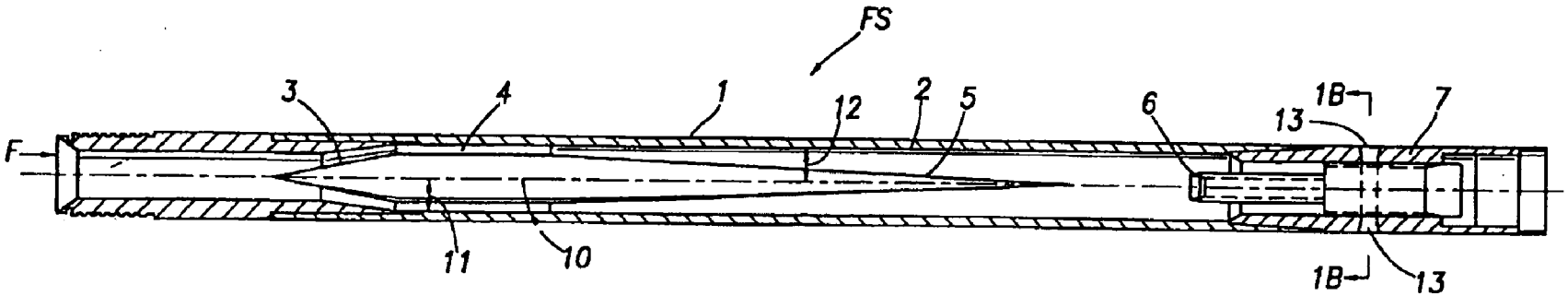
FIGS. 1A and 1B illustrate a preferred embodiment of a fluid separator in accordance with the present invention, in cutaway.
Figure 1B:
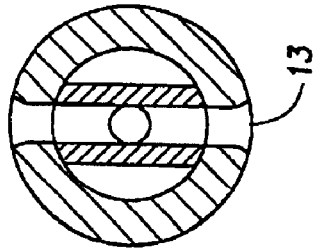
Figure 2:
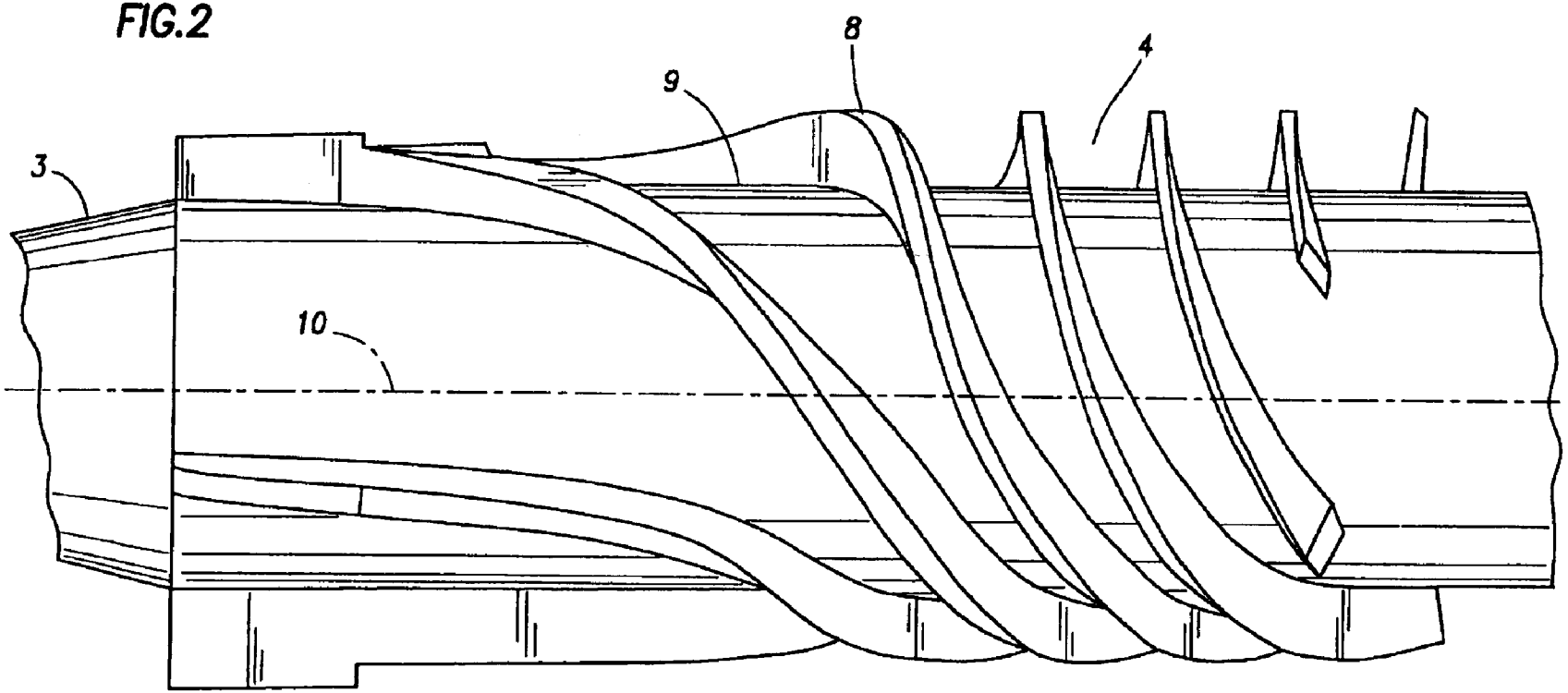
FIG. 2 is an elevational view of a portion of the preferred embodiment of the fluid separator, the portion illustrating vanes.
Figure 3A:
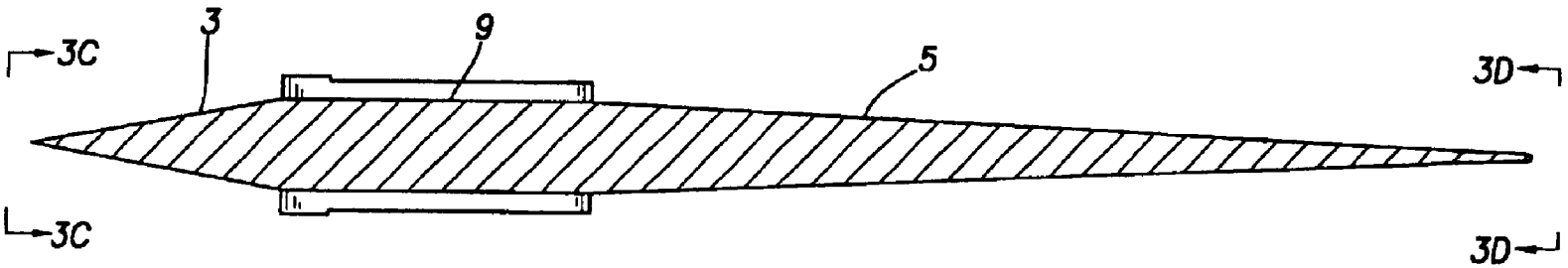
FIGS. 3A, 3B, 3C and 3D illustrate dimensions of the preferred embodiment.
Figure 3B:
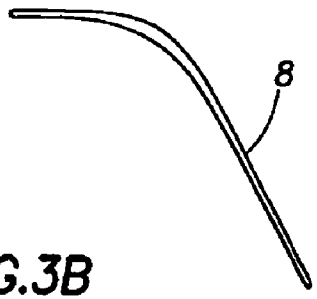
Figure 3C:
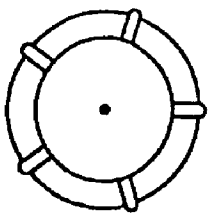
Figure 3D:
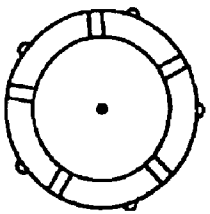

A preferred embodiment of the instant apparatus, which was designed particularly for the separation of a liquid/gas mixture downhole and for test purposes, is illustrated in FIGS. 1–3. The embodiment comprises a cylindrical outer housing 1, as illustrated in FIG. 1. The cylindrical outer housing 1 has cylindrical bore 2 and a tapered barrier, or conical flow diverter 3, at the entrance to housing 1 creating a flow path, left to right, of gradually increasing annularity. A set of turning vanes 8, illustrated in FIG. 2, are attached to a body portion 9 of a base element located within passageway 4 defined by bore 2 of housing 1. The base element includes entry conical flow diverter 3, a body portion 9 having vanes 8 and transition cone 5, also referred to as a tapered barrier, located downstream of turning vanes 8. Transition cone 5 creates a flow path of gradually increasing cross-sectional area. Turning vanes 8 introduce swirl to, or centrifugally accelerate, fluid flowing through passageway 4 in housing 1 from left to right. The vanes are structured with an increasing pitch angle to increase the rate of centrifugal acceleration in the direction of flow.

Transition cone 5, downstream of turning vanes 8 (in the preferred embodiment there are five turning vanes) gradually increases the cross-sectional area of flow of the centrifugally accelerated fluid. FIG. 7 illustrates the results of a numerical simulation of the effect of increasing the flow path area. Interesting results can be seen in the swirl direction figure and acceleration figure.

A first fluid or lighter fluid extraction port 6 is centered downstream in housing 1 for collecting the lighter fluid stream which would migrate by density toward the center of the passageway. Bypass sub 7 routes the heavier fluid stream which would migrate toward the outer periphery of bore 2 onward to the rest of the downhole assembly. Bypass sub 7 also permits venting the first fluid to the wellbore through vent ports 13. Alternate embodiments might retain the lighter fluid and route it along a path parallel to the heavier fluid phase.

Extraction port 6 and bypass sub 7 form one means for separating centrifugally accelerated fluids, such as gas and liquid, by density into at least two streams. Those familiar with centrifugal separators will be familiar with other design choices for separating into two streams of centrifugally accelerated fluid. The intended application should dictate the design choice of the separation means.

The "annularity" of the downhole passageway increases, and increases smoothly and gradually, in the disclosed embodiment as fluid flows over diverter 3 from left to right. A passageway of increasing annularity is created, being a passageway whose cross-sectional area of flow has an increasing average radius. The notion of "average" radius is discussed above.

The flow path through turning vanes 8 disclosed in FIGS. 1A and 1B comprises a relatively narrow annular passageway. The maximum dimensions of the passageway are limited by the general restrictions upon the design of the downhole tool. The annular passageway tends to maximize the average radius at which swirl, or centrifugal acceleration, is induced so that correspondingly the annular velocity imparted to the fluid tends to be maximized. Tests have shown that accelerations of between 1,000–2,000 gs can be achieved over the design range of flow conditions for embodiments such as that illustrated. Higher acceleration should result in more rapid phase separation. The average radius at which swirl is induced, indicated as radius 11 in FIGS. 1A and 1B, is preferably greater than 75% of the radius of the annular passageway. The radius of the passageway is the distance between axial center line 10 and the inside of housing 1 defining bore 2. This radius is identified as radius 12 in the drawing in FIGS. 1A and 1B.

FIGS. 3A–3D illustrate relative dimensions of a preferred embodiment for a downhole separator turning vane module. The preferred material would be stainless steel.

FIG. 2 illustrates the pitch angle of the vanes of a preferred embodiment of the present invention. If the pitch angle is defined as the angle between a tangent to the vane and the longitudinal direction of flow through the passageway, e.g. line 10, then FIG. 2 illustrates that the vanes of the preferred embodiment have an initial pitch angle of approximately 0° and a final pitch angle of approximately 60°. The turning vane profile comprises a variable pitch helix offering an essentially axial flow direction at entry. The vane defines a high discharge angle and requires an axial length of only approximately 1/10th of the overall length of the tool. The vane of the preferred embodiment has been shown to generate high swirl rates, or high centrifugal acceleration, with minimal pressure drop. Prior art devices teach to the contrary, namely full length low pitch vanes which span nearly the full diameter of the device and suffer from higher pressure drops, greater overall length and lower separation efficiencies.

Concentric extraction port 6, as illustrated in FIGS. 1A and 1B channels the fluid of lesser density, such as gas, out of the fluid phase separation chamber, without an initial direction change. This enhances stability and minimizes remixing of the fluids. The preferred embodiment vents this lower density fluid or gas to the wellbore by two identical vent ports 13 which are located diametrically opposite to each other to avoid lateral thrust on the tool. Orifice diameter can profitability be varied to accommodate different operating conditions such as wellbore temperature/pressure, bottomhole assembly pressure drop, liquid and gas mass flow rates, etc. Orifice replacement should be a simple task, external to the tool. Preferably internal surfaces in contact with fluid flow are machined to a high finish and all direction changes are gradual. Use of the tapered or conical barriers, diverter 3 and transition cone 5, accomplish gradual changes in cross-sectional area of flow in the preferred embodiment. Such gradual directional changes minimize turbulence, induced pressure drop and phase remixing.

Figure 5:
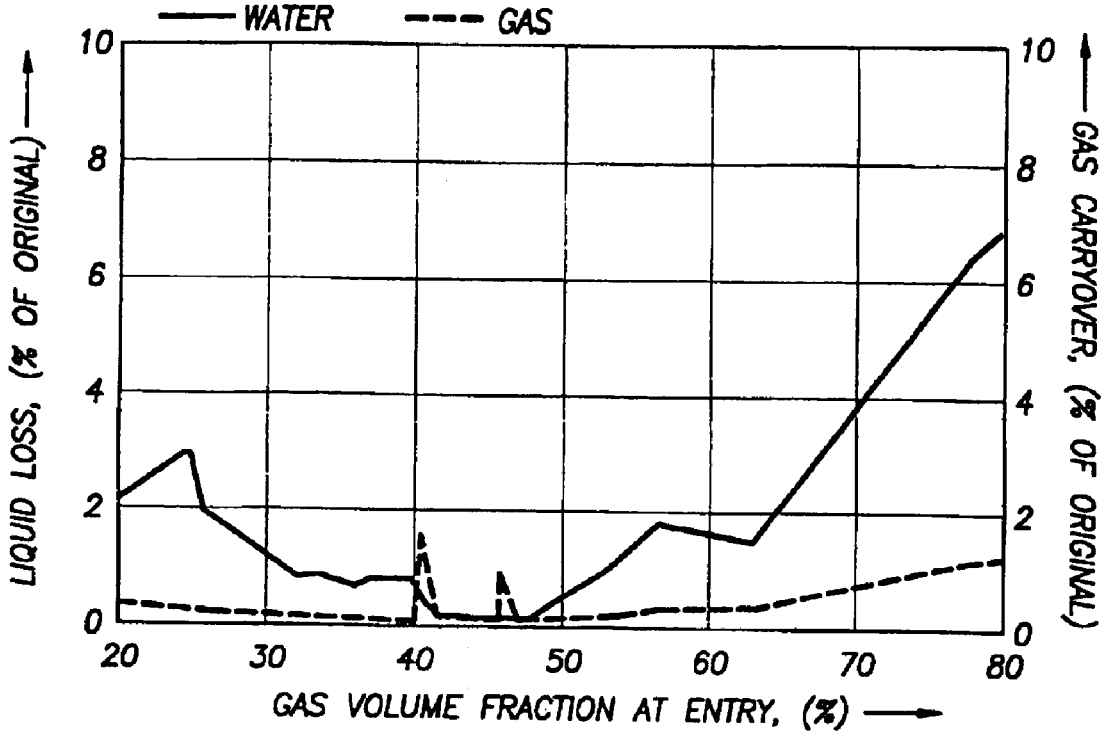
FIGS. 5 and 6 comprise charts of shop test results.
Figure 6:
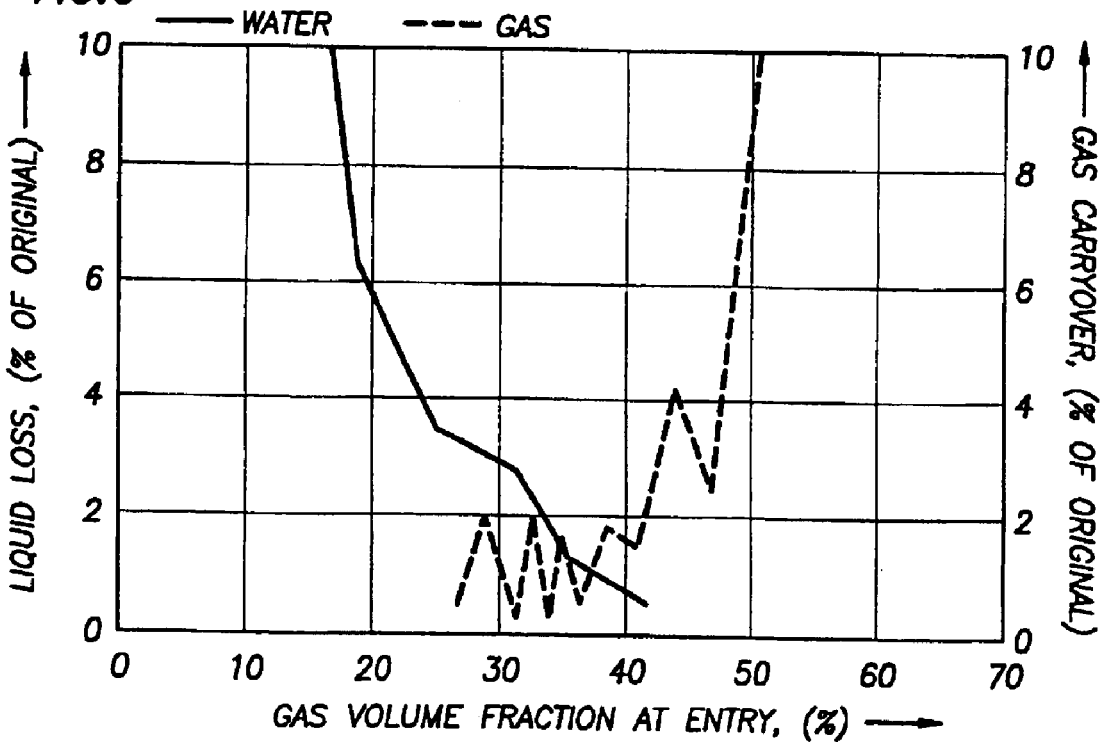

A computer model was developed and used to design the 1¾ inch prototype tool illustrated in FIGS. 1–3. Results of the model study are illustrated in the table of FIG. 7. Shop tests were then conducted of an actual prototype under flow rate and pressure conditions suitable for jetting. Shop test results are illustrated in the graphs of FIGS. 5 and 6. The shop tests established that basic tool performance was in good agreement with computer modeling. Shop tests indicated that gas carryover into the liquid stream and liquid loss with the gas discharge stream could be as low as 3% of the original gas and liquid volumes respectively. Tool pressure drop was generally below 25 psi. The overall tool length of 30 inches proved satisfactory. A larger diameter tool should permit higher accelerations. The larger diameter should also permit "over separation" of gas and liquid with extra liquid being dumped to the wellbore to enhance cuttings transport. Such a tool and technique can remove existing volume flow rate limitations associated with downhole motors, which would be particularly useful in operations such as coiled tubing operations (but also may be useful with similar operations using tubulars) and may, for example, make it possible in drilling to independently optimize both motor performance and cuttings transport more satisfactorily.

Even though separation efficiency is quite high for the preferred embodiment, it is clear that multiple stage designs could be utilized, for instance in the event that gas leaving solution below a first stage should become unacceptable.

A key aspect of the present invention is illustrated in FIG. 4. FIG. 4 illustrates a method of using a fluid separator DFS with tubing, such as coiled tubing CT, in a well bore WB. Bottomhole assembly BHA locates downhole fluid separator DFS upstream (considering the direction D of pumped fluid F) of motor M. Downstream of motor M is further tool unit U. FIG. 4 illustrates plural fluids F1 and F2 being pumped downhole through tubing CT. Fluid separator DFS separates the fluids into portions F1 and F2. FIG. 4 illustrates portion F2 continuing through motor M and portion F1 being diverted to the annulus of wellbore WB. Upon the surface coiled tubing CT is reeled from reel RL and injected into wellbore WB with an injector 1 through well head WH. Fluids F1 and F2 can be any fluid mixture separable by density. The tubing, although illustrated as coiled tubing, could be tubulars or jointed pipe.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. A downhole method for separating fluids flowing through a well comprising:

pumping a fluid mixture downhole;

centrifugally accelerating downward flow of pumped fluid through at least a portion of a downhole passageway; [and]

separating centrifugally accelerated fluid by density into [at least two fluid streams] *a lower density and a higher density fluid stream, the higher density fluid stream continuing through a downhole tool.*

2. A downhole method for separating fluids flowing through a well, comprising:

accelerating, at an increasing rate, centrifugally the flow of fluid through at least a portion of a downhole passageway using a plurality of vanes having pitch angles graduating from low to high in a direction of flow over a substantial portion of a vane length while maintaining cross-sectional area of flow substantially constant; and separating centrifugally accelerated fluid by density into at least two fluid streams.

3. A downhole method for separating fluids flowing through a well, comprising:

establishing through gradual increase, in at least a portion of a downhole passageway defined by a housing bore, annular fluid flow having cross-sectional area of flow with an average radius that gradually increases in value over a length of a portion of the passageway from a value below 75% of a radius of the corresponding passageway portion to a value above 75% of the radius of the corresponding passageway portion;

centrifugally accelerating flow of fluid through at least a portion of the downhole passageway; and separating centrifugally accelerated fluid by density into at least two fluid streams.

4. The method of claims 1 or 2 that includes establishing, in at least a portion of the downhole passageway, annular fluid flow.

5. The method of claims 1, 2 or 3 that includes gradually establishing, in at least a portion of the downhole passageway, annular fluid flow.

6. The method of claims 1 or 2 that includes gradually establishing, in at least a portion of the downhole passageway defined by a housing bore, annular fluid flow having a cross-sectional area of flow with an average radius greater than 75% of a radius of the corresponding passageway portion.

7. The method of claims 1 or 3 that includes accelerating, at an increasing rate, centrifugally the flow of fluid through at least the portion of the downhole passageway.

8. The method of claims 1, 2 or 3 that includes receiving centrifugally flowing fluid in a chamber defining a flow path with a cross-sectional area of flow that gradually increases.

9. The method of claims 2 or 3 that includes pumping a fluid mixture downhole and wherein the centrifugally accelerated flow is established with at least a portion of the downward pumped fluid.

10. The method of claims [1,] 2 or 3 wherein the at least two separated fluid streams include a predominately liquid stream and a predominately gas stream.

11. The method of claim 10 wherein the predominately liquid stream contains less than 10% gas by volume.

12. The method of claim 3 wherein the centrifugal accelerating occurs subsequent to the establishing of annular flow.

13. The method of claims [1,] 2 or 3 wherein a pressure loss from applying the method for at least one separated fluid stream is less than 15%.

14. Surface and downhole apparatus for separating fluids flowing in a well, comprising:

a pump attached at the surface to tubing attached to a downhole assembly wherein at least a portion of the downhole assembly defines a fluid passageway having a direction of flow away from the pump;

at least one vane attached within a portion of the fluid passageway, the vane passageway portion being in fluid communication with the pump, and means, in fluid communication with the vane passageway portion, for separating centrifugally accelerated fluid by density into [at least two streams] *a lower density and a higher density fluid stream, wherein the heavier fluid stream is utilized in a downhole tool*.

15. Apparatus for separating fluids flowing in a well, comprising:

a downhole assembly having a portion defining a fluid passageway with the fluid having a direction of flow in the passageway having a substantially constant cross-sectional area of flow;

a plurality of vanes attached within the portion of the fluid passageway, the vanes having pitch angles graduating from low to high in the direction of flow over a substantial portion of the vane length; and means, in fluid communication with the vane passageway portion, for separating centrifugally accelerated fluid by density into at least two streams.

16. Apparatus for separating fluid flowing in a well, comprising:

at least a portion of a downhole assembly defining an annular fluid passageway within a housing bore, the annular passageway defining a fluid flow path having a cross-sectional area of flow with an average radius gradually increasing from below to greater than 75% of a radius of the corresponding passageway portion;

a vane attached within a portion of a passageway defined by the portion of the downhole assembly; and means, in fluid communication with the vane passageway portion, for separating centrifugally accelerated fluid by density into at least two streams.

17. The apparatus of claim 16 wherein the vane is attached within a portion of the annular passageway.

18. The apparatus of claims 14, 15 or 16 wherein at least a portion of the downhole assembly defines an annular passageway having a gradually increasing annularity and a gradually increasing inside radius in a direction of fluid flow.

19. The apparatus of claims 14 or 15 wherein at least a portion of the downhole assembly defines an annular fluid passageway within a housing bore, the annular passageway defining a flow of fluid having a cross-sectional area of flow with an average radius greater than 75% of a radius of the corresponding passageway portion.

20. The apparatus of claims 14 or 16 wherein the vane passageway portion defines a direction of flow and the vane has a pitch angle graduating from low to high in the direction of flow.

21. The apparatus of claim 14, 15 or 16 that includes a chamber, in direct fluid communication with the vane passageway portion, the chamber defining a flow of fluid with a cross-sectional area of flow that gradually increases in a direction of flow.

22. The apparatus of claim 15 or 16 that includes a pump attached at a surface to tubing attached to the downhole assembly in the well and wherein the fluid separated is fluid pumped down.

23. The apparatus of claims 14, 15 or 16 wherein the apparatus is less than three feet long.

24. Apparatus for separating fluids flowing in a well, comprising:

at least a portion of a downhole assembly defining an annular fluid passageway, a portion of the annular passageway having gradually increasing annularity and gradually increasing inside radius in a direction of fluid flow;

a vane attached within a portion of a passageway defined by a portion of the downhole assembly; and means, in fluid communication with the vane passageway portion, for separating centrifugally accelerated fluid by density into at least two streams; and wherein the portion of the annular passageway of increasing annularity includes a tapered barrier located in the passageway.

25. The apparatus of claim 24 wherein the vane passageway portion is attached to a downstream end of the annular fluid passageway with gradually increasing annularity.

26. Apparatus for separating fluids flowing in a well, comprising:

at least one vane attached within a portion of a fluid passageway defined by at least a portion of a downhole assembly;

a chamber, in direct fluid communication with the vane passageway portion, the chamber defining a flow of fluid with a cross-sectional area of flow that gradually increases;

means, in fluid communication with the chamber, for separating centrifugally accelerated fluid by density into at least two streams; and wherein the chamber defining a flow of fluid with an increasing cross-sectional area of flow contains a tapered barrier located therein.

27. A method for operating a downhole assembly in a well with coiled tubing, comprising:

pumping a fluid mixture down tubing to a downhole assembly;

separating the fluid mixture downhole by density into at least two fluid streams; and using at least one fluid stream with a downhole assembly tool.

28. The method of claim 27 that includes using at least one fluid stream with a downhole assembly motor.

29. The method of claim 27 that includes using at least one fluid stream with a downhole assembly jetting tool.

30. The method of claim 27 that includes venting at least one fluid stream to the wellbore.

31. The method of claim 27 that includes separating the fluid mixture such that one stream is predominately liquid and one stream is predominately gas.

32. The method of claim 31 wherein the liquid stream contains less than 10% of gas.

33. The method of claim 27 wherein a loss of pressure of at least one separated fluid stream pumped downhole, occasioned by the separating, is less than 10% of the tool to wellbore pressure differential.

34. The method of claim 27 wherein a loss of pressure of at least one separated fluid stream piped downhole, occasioned by the separating, is less than 100 psi.

35. Surface and downhole apparatus for use at a well, comprising:

tubing attached to a downhole [assembly] *tool*;

a pump attached at the surface to the tubing; and a fluid separator associated with the downhole [assembly] *tool,* located and structured in combination with the [assembly] *tool,* to separate by density a fluid mixture pumped down the tubing into [at least two fluid streams] *a lower density and a higher density fluid stream, wherein the heavier fluid stream is directed through the downhole tool*.

[36. The apparatus of claim 35 that includes a tool associated with the downhole assembly in fluid communication with at least one separated fluid stream.]

37. The apparatus of claim 3[6]*5, where*in the *downhole* tool comprises a downhole motor.

38. The apparatus of claim 3[6]*5,* wherein the *downhole* tool comprises a downhole jetting tool.

39. The apparatus of claim 35 wherein the fluid separator comprises a centrifugal separator.

40. The apparatus of claim 35 wherein the tubing is coiled tubing.

*41. The method of claim 1, wherein the downhole tool comprises a downhole motor.*

*42. The method of claim 1, wherein the downhole tool comprises a downhole jetting tool.*

*43. The apparatus of claim 14, wherein the downhole tool comprises a downhole motor.*

*44. The apparatus of claim 14, wherein the downhole tool comprises a downhole jetting tool.*

*45. A downhole method for separating fluids flowing through a well comprising:*

*pumping a fluid mixture downhole;*

*centrifugally accelerating downward flow of a pumped fluid mixture through at least a portion of a downhole passageway;*

*separating a centrifugally accelerated fluid mixture by density into a liquid and a gas stream; and*

*operating a downhole tool with the liquid stream.*

*46. The method of claim 45, wherein the downhole tool comprises a downhole motor.*

*47. The method of claim 45, wherein the downhole tool comprises a downhole jetting tool.*

*48. Surface and downhole apparatus for separating fluids flowing in a well, comprising:*

*a pump attached at the surface to tubing attached to a downhole assembly wherein at least a portion of the downhole assembly defines a fluid passageway having a direction of flow away from the pump;*

*at least one vane attached within a portion of the fluid passageway, the vane passageway portion being in fluid communication with the pump; and*

*means, in fluid communication with the vane passageway portion, for separating a centrifugally accelerated fluid mixture by density into a liquid and a gas stream, wherein the liquid stream is directed to a downhole tool.*

*49. The apparatus of claim 48, wherein the downhole tool comprises a downhole motor.*

*50. The apparatus of claim 48, wherein the downhole tool comprises a downhole jetting tool.*

*51. Surface and downhole apparatus for use at a well comprising:*

*tubing attached to a downhole tool;*

*a pump attached at the surface to the tubing; and*

*a fluid separator associated with the downhole tool to separate by density a fluid mixture pumped down the tubing into a liquid and a gas stream, wherein the downhole tool utilizes the liquid stream.*

*52. The apparatus of claim 51, wherein the downhole tool comprises a downhole motor.*

*53. The apparatus of claim 51, wherein the downhole tool comprises a downhole jetting tool.*

* * * * *